(12) United States Patent  (10) Patent No.: US 6,578,602 B1
Kirschner  (45) Date of Patent: Jun. 17, 2003

(54) ALARM VALVE SYSTEM

(75) Inventor: Kraig A. Kirschner, Corona, CA (US)

(73) Assignee: Automatic Fire Control, Incorporated, South El Monte, CA (US)

( * ) Notice: Subject to any disclaimer, the term of this patent is extended or adjusted under 35 U.S.C. 154(b) by 1 day.

(21) Appl. No.: 09/927,769

(22) Filed: Aug. 10, 2001

(51) Int. Cl.$^7$ ............................................... F16K 37/00
(52) U.S. Cl. ........................ 137/552; 137/312; 137/557; 137/558; 169/23
(58) Field of Search ................................ 137/312, 552, 137/557, 558; 169/16, 17, 19, 20, 23

(56) References Cited

U.S. PATENT DOCUMENTS

| | | | | |
|---|---|---|---|---|
| 249,197 A | * | 11/1881 | Meloon | 169/23 |
| 384,514 A | * | 6/1888 | Dowsen et al. | 169/23 |
| 688,304 A | * | 12/1901 | Grinnell | 169/23 |
| 868,624 A | * | 10/1907 | Bauer | 169/23 |
| 1,058,042 A | * | 4/1913 | Derby | 169/23 |
| 1,076,302 A | * | 10/1913 | McElroy | 137/312 |
| 1,558,623 A | * | 10/1925 | Park | 169/23 |
| 1,976,022 A | * | 10/1934 | Hutchinson | 169/20 |
| 3,220,483 A | * | 11/1965 | Hoevenaar | 169/22 |
| 6,102,066 A | * | 8/2000 | Craig et al. | 137/312 |

* cited by examiner

*Primary Examiner*—John Rivell
(74) *Attorney, Agent, or Firm*—Fulbright & Jaworski L.L.P.

(57) ABSTRACT

An alarm valve system includes a valve body, a valve seat in the valve body with a groove in the sealing face of the seat. A valve element is positioned to seat on the sealing face. A vent extends from the groove in the valve seat to be in communication with a flow alarm and an accumulator alarm. The accumulator alarm includes a cavity with an opening above and a liquid level switch in the cavity. A drain valve is below the cavity.

10 Claims, 2 Drawing Sheets

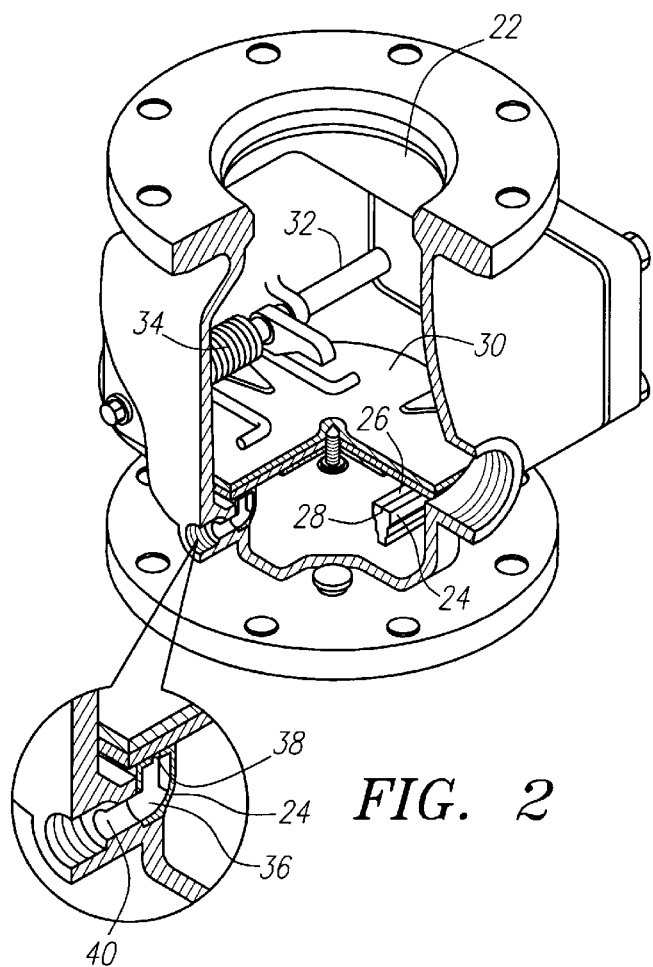
FIG. 2
FIG. 3
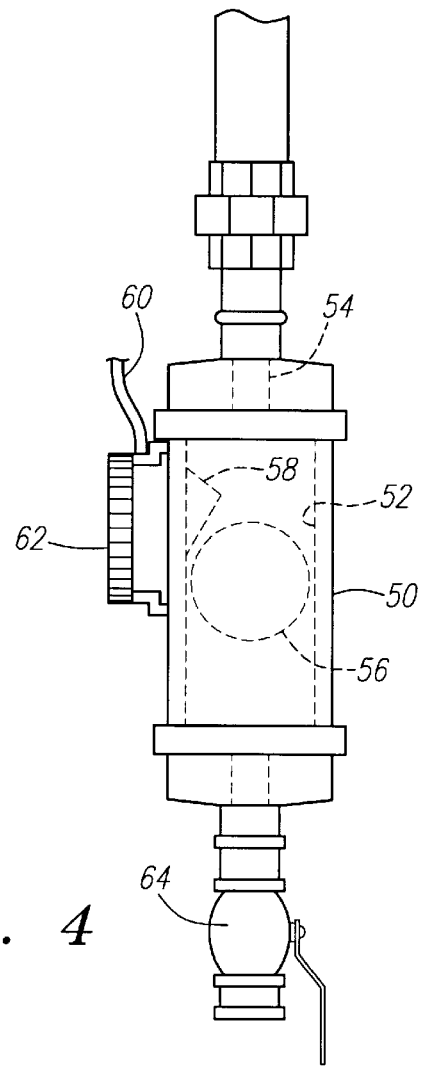
FIG. 4

ALARM VALVE SYSTEM

BACKGROUND OF THE INVENTION

The field of the present invention is valving associated with alarms to detect flow in piping.

Piping systems which maintain a charge of water such as fire sprinkler systems commonly employ alarm valves which indicate flow through the system. In turn, such flow indicates use of the system such as during a fire sprinkler discharge, fire hose activation or the like. The alarms associated with such systems are commonly mechanical in nature to activate a local gong. Switches associated with electric alarm circuits may also be employed. Such systems are designed to detect flow indicative of proper operation of the system. With a first sprinkler system, the flow detected may be in the range of 15 GPM and above. For example, a flow of 15 GPM might reflect the discharge of a single fire sprinkler associated with the piping system.

Such alarms are typically arranged in a vertical rise of pipe which includes a valve body having a seat and a pivotally mounted flapper valve. The seat typically employs a groove in the sealing face thereof extending fully thereabout. A vent from the groove extends to atmosphere through a restricting orifice, a retard chamber and a conventional flow alarm device. When the flapper valve is opened by flow through the piping, the groove is exposed to the liquid and a small amount of flow is allowed to pass through the restricting orifice and ultimately activate the flow alarm device.

Piping systems employing such valves such as fire sprinklers are charged with liquid and then sealed. The liquid, typically water from a community water supply, is heated by the ambient conditions about the system to raise the pressure within the piping above that of the supply. This results in the pressure within the system rising significantly above the pressure within the water supply. This rise is also greater than the often experienced spikes in pressure within such supply systems. This overpressure within the piping system maintains the flapper valve within the alarm valve closed.

Further, regulations also frequently require backflow preventers in fire sprinkler systems. The water within the piping is stagnant and can accumulate impurities and organisms detrimental to the integrity of a community water supply. Such backflow preventers are typically check valves such as a spring biased flapper held against a seat. Such backflow preventers are unable to be monitored for leakage. Further, they do not monitor the integrity of the alarm valve without removal. Even then, only substantial dysfunction in the backflow preventer is likely to be detected.

Many moisture and flow detection devices are commercially available for a variety of uses. One such device is referred to here as an accumulator alarm. A cavity having an opening from above receives moisture. The moisture is able to accumulate within the cavity until a liquid level switch is actuated. The actual mechanism may be a float associated with a microswitch, contacts of a circuit closed by the conductivity of the liquid or the like. Such devices are typically able to be drained and reset for repeated use.

SUMMARY OF THE INVENTION

The present invention is directed to an alarm valve system including a valve body with a valve element cooperating with a valve seat therein. The seat includes a groove in the face thereof extending to a vent. A flow alarm is in communication with the vent.

In a first separate aspect of the present invention, an accumulator alarm is also in fluid communication with the vent. Leakage flow not associated with system operation is, thereby, monitored. Reliance on the integrity of a blackflow preventer can be avoided.

In a second separate aspect of the present invention, an accumulator alarm in fluid communication with the vent is associated with the alarm valve system and includes a cavity having an opening from above. A liquid level switch is activated by the accumulation of water within the cavity. A drain valve may also be employed for convenient resetting of the switch.

In a third separate aspect of the present invention, a combination of the foregoing aspects is also contemplated.

Accordingly, it is an object of the present invention to provide an improved alarm valve system. Other and further objects and advantages will appear hereinafter.

BRIEF DESCRIPTION OF THE DRAWINGS

FIG. 2 is a perspective view of the valve with the valve housing partially sectioned.

FIG. 3 is a detail of a vent associated with the valve.

FIG. 4 is a side view of an accumulator alarm.

DETAILED DESCRIPTION OF THE PREFERRED EMBODIMENTS

Figure 1:
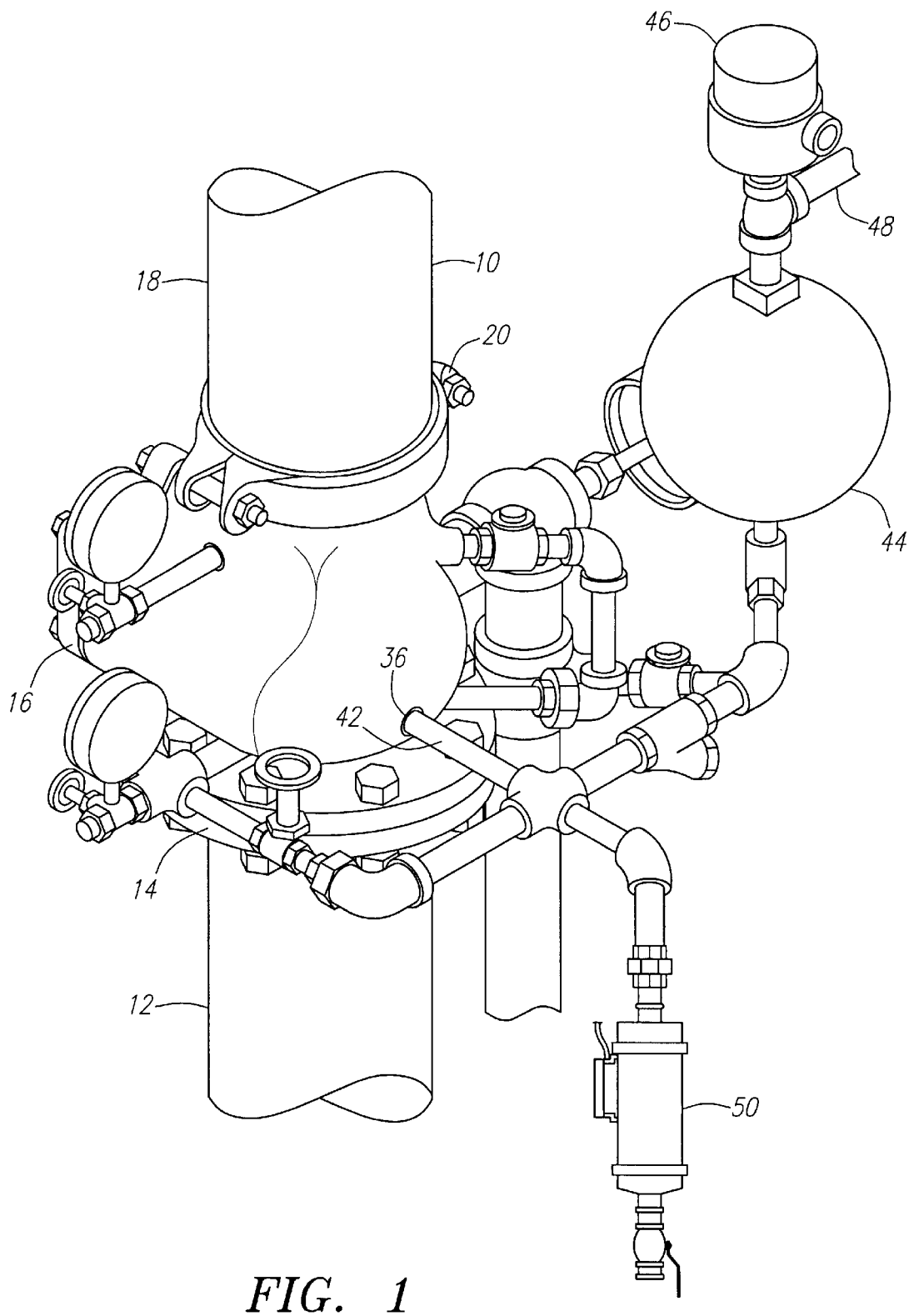
FIG. 1 is a perspective view of an alarm valve system including an accumulator alarm.

Turning in detail to the figures, an alarm valve system is illustrated which is associated with a vertical rise in a line of piping 10. A first pipe 12 extends upwardly to a pipe flange 14. A valve body 16 is bolted to the pipe flange 14 in a sealed manner. A further pipe 18 extends upwardly from and is affixed to the valve body 16 using clamping hardware 20.

The valve body 16, best illustrated in FIG. 2, includes a passage 22 therethrough. A valve seat 24 extends about the passage 22 and is sealed to the valve body 16 such that flow is only possible through the interior of the seat 24. The seat 24 includes a sealing face 26 with a groove 28 located in the sealing face 26 and extending fully about the seat 24. A valve element 30 extends across the passage 22 to seal against the sealing face 26 of the valve seat 24. This valve element 30 is a flapper valve which is pivotally mounted about a pin 32. A torsion spring 34 biases the flapper valve 30 into sealing engagement with the valve seat 24. The flapper valve 30 extends across the seat 24 so as to span the groove 28. The water pressure which accumulates above the flapper valve 30 ideally seals the valve 30 against the sealing face 26 on both sides of the groove 28. When a valve, such as a sprinkler valve, is opened downstream of the flapper valve 30, pressure drops within the pipe 18 and the source of pressure through pipe 12 forces open the valve 30 against the bias of the spring 34 to direct flow upwardly through the valve system.

A vent 36, illustrated in detail in FIG. 3, includes an orifice 38 which restricts flow. The orifice 38 and a portion of the vent 36 extend through the valve seat 24 with the orifice 38 in direct communication with the groove 28. The vent 36 further extends through the valve body 16 at 40. Thus, any leakage across the outer portion of the sealing face 26 between the passage 22 and the groove 28 is communicated through the groove 28 to the orifice 38 such that it can flow toward atmosphere through the vent 36.

Returning to FIG. 1, the vent 36 is coupled with a pipe 42 which is in fluid communication with a conventional retard chamber 44 and a conventional flow alarm 46. The retard chamber 44 and flow alarm 46 vent to atmosphere through the pipe 48.

An accumulator alarm 50 is also in fluid communication with the pipe 42. The accumulator alarm 50 is illustrated in detail in FIG. 4. The alarm 50 includes a cavity 52 with an opening 54 above and a liquid level switch 56. Illustrated is a float 56 associated with a microswitch 58. The microswitch 58 is able to close a circuit coupled with electrical service 60 to actuate a horn 62 or other near or remove alarm device. A drain valve 64 shown here as a ball valve located below the cavity 52 and in fluid communication therewith provides for a draining of the cavity 52 during initial set up and for resetting after the accumulator alarm 50 has been actuated.

In operation, without any demand for flow through the pipe 10, any leak across the sealing face 26 of the valve seat 24 will accumulate in the groove 28. Ultimately, the leaking liquid will collect in the cavity 52 of the accumulator alarm 50. As the accumulator alarm 50 depends from the alarm piping system and the system is vented through the flow alarm 46 to atmosphere, liquid can freely accumulate within the cavity 52. Once sufficient liquid has accumulated, the float 56 actuates the microswitch 58 to sound an alarm indicating backflow across the flapper valve 30. Independently of any leakage, when demand is required for flow through the piping 10, the flapper valve 30 is lifted from the valve seat 24 and sufficient flow is experienced through the vent 36 to overcome the retard chamber 44 and actuate the flow alarm 46. Thus, both a flow alarm valve function and a backflow alarm valve function are accomplished through the foregoing combination.

While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An alarm valve system comprising
   a valve body including a passage therethrough;
   a valve seat in the valve body including a sealing face and a groove in the sealing face extending about the passage;
   a valve element positioned in the valve body to extend across the passage and seat on the sealing face;
   a vent extending from the groove;
   a flow alarm in fluid communication with the vent;
   an accumulator alarm in fluid communication with the vent.

2. The alarm valve system of claim 1, the valve element being a flapper element pivotally mounted relative to the valve body.

3. The alarm valve system of claim 1, the vent including a restricting orifice.

4. The alarm valve system of claim 1, the accumulator alarm being below the vent.

5. The alarm valve system of claim 4, the flow alarm being higher than the accumulator alarm.

6. The alarm valve system of claim 1, the accumulator alarm including a cavity with an opening above the cavity in fluid communication with the vent and a liquid level switch in the cavity.

7. The alarm valve system of claim 6, the accumulator alarm further including a drain valve below the cavity.

8. An alarm valve system comprising
   a valve body including a passage therethrough;
   a valve seat in the valve body and including a sealing face and a groove in the sealing face extending about the passage;
   a flapper element pivotally mounted relative to the valve body to extend across the passage and seat on the sealing face;
   a vent including a restricting orifice and extending from the groove through the valve body;
   a flow alarm in fluid communication with the vent;
   an accumulator alarm lower than the flow alarm and in fluid communication with the vent.

9. The alarm valve system of claim 8, the accumulator alarm including a cavity with an opening above the cavity in fluid communication with the vent and a liquid level switch in the cavity.

10. The alarm valve system of claim 9, the accumulator alarm further including a drain valve below the cavity.

* * * * *